Aug. 14, 1923.
C. S. PYSER
1,464,999
APPARATUS FOR DEMONSTRATING OR TESTING THE TRANSMISSION OF
LIGHT BY OPHTHALMIC GLASS AND THE LIKE
Filed Nov. 21, 1922    2 Sheets-Sheet 1
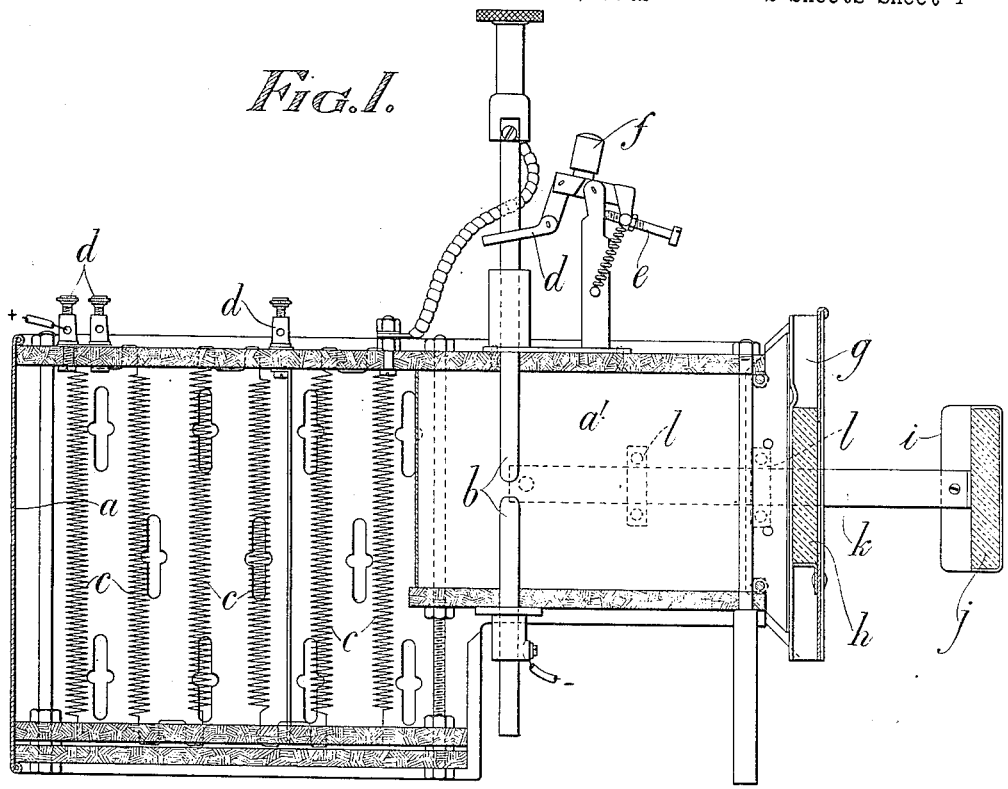
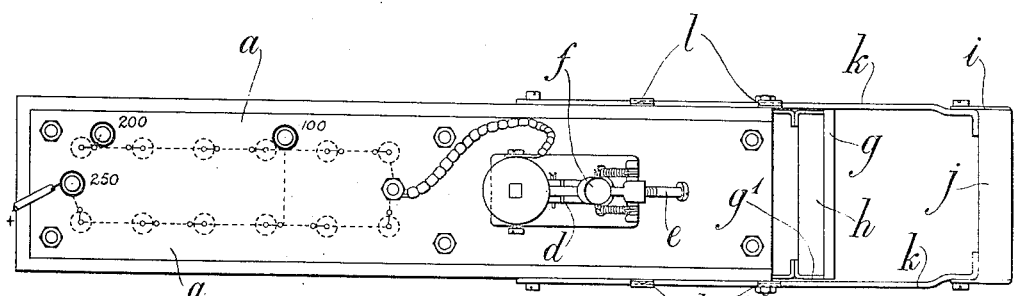
Charles Stuart Pyser
INVENTOR
BY E. G. Siggers
ATTORNEY

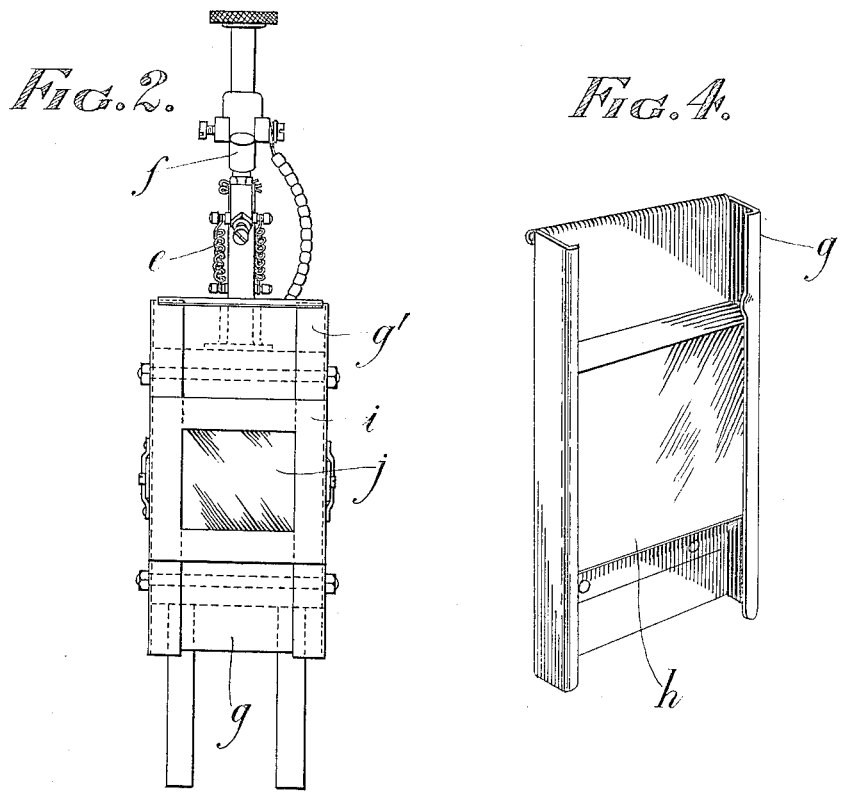

Patented Aug. 14, 1923.

1,464,999

UNITED STATES PATENT OFFICE.

CHARLES STUART PYSER, OF LONDON, ENGLAND, ASSIGNOR TO THE MAYFAIR OPTICAL COMPANY, LIMITED, OF LONDON, ENGLAND, A CORPORATION.

APPARATUS FOR DEMONSTRATING OR TESTING THE TRANSMISSION OF LIGHT BY OPHTHALMIC GLASS AND THE LIKE.

Application filed November 21, 1922. Serial No. 602,417.

*To all whom it may concern:*

Be it known that I, CHARLES STUART PYSER, a subject of the King of England, residing at 38 Blandford Street, London, W. 1, in the Kingdom of England, have invented certain new and useful Improvements in Apparatus for Demonstrating or Testing the Transmission of Light by Ophthalmic Glass and the like, of which the following is a specification.

This invention refers to improvements in or relating to apparatus for demonstrating or testing the transmission of light by ophthalmic glass and the like, and it has for its object to provide a convenient and portable apparatus by means of which an optician or other person can readily demonstrate to his clients in a practical and convincing manner the merits of certain specially prepared glass as a medium for excluding or absorbing the noxious ultra-violet rays, and also its transparency to light.

The invention has more particular reference to testing apparatus of the kind comprising a lamp chamber enclosing an arc lamp having carbons producing a light rich in ultra-violet rays, an opening in said chamber, a filter or screen of glass or the like in said opening permitting only the passage of ultra-violet rays through the said screen on to the articles to be tested.

Now according to the present invention we provide apparatus of the kind described adapted for demonstrating or testing the transmission of light by ophthalmic glass and the like, by the provision of a fluorescent screen to co-operate with the screen or light filter and to test the light-transmitting qualities of materials placed between said screens.

In order that the present invention may be clearly understood and more readily carried into effect it is hereinafter described with reference to the accompanying drawings, in which:—

Figure 1 is a sectional side elevation of a simple form of apparatus constructed in accordance with the present invention;

Figure 2 is a front view of said apparatus;

Figure 3 is a plan view corresponding to Figure 1, and

Figure 4 is an enlarged perspective view of the slide and the opaque screen.

According to the present invention the improved apparatus comprises a suitable fireproof casing $a$ of metal and insulating material conveniently of substantially flat rectangular formation. In the particular construction shown the casing is formed from a single sheet of metal which is bent round at the rear end so as to form two spaced parallel side members between which are secured by flanges thereon the top and bottom sheets or strips of insulating material to which the resistance elements of the lamp are connected. The rear portion of the casing is suitably perforated or fenestrated to allow of the escape of the heat. The one end or front portion of the said apparatus is conveniently constructed to form a lamp-house $a'$ containing a suitable illuminating device for instance as a miniature electric arc lamp $b$. The rear portion of the case $a$ of the apparatus is adapted to contain a suitable resistance or resistances $c$ with external terminals $d$ providing means whereby the apparatus can be adapted for voltages varying within suitable limits, such for instance as voltages varying from 100 to 250. The lamp $b$ employed is preferably one adapted to produce a light rich in ultra-violet rays and in the case of an electric arc lamp being employed, this can be effected by the employment of chromic-steel pencils in the place of the usual carbons. These chromic-steel pencils besides producing a light rich in ultra-violet rays possess the advantage that they will burn for long periods without appreciable consumption. The arc-striking mechanism may conveniently though not necessarily, be of the kind described in the specification of British Letters Patent No. 160,569, in which the arc is struck by means of a spring-controlled ring clutch $d$ working in conjunction with an adjustable stop $e$ and in which means such as the insulated finger knob $f$ are provided for manually feeding the electrodes as they are consumed. At the front $a'$ of the instrument and in front of the arc $b$ and in a suitably constructed slide $g$ movable in guides $g'$ is placed a piece of opaque glass or other material $h$ which will exclude or absorb all visible light and permit only the ultra-violet rays to pass out. In front of this opaque screen $h$ and arranged in another slide or holder $i$ is provided another screen $j$ formed of uranium glass upon which the ultra-violet rays after passing through the first opaque screen $h$ are adapted to fluoresce. The holder $i$ in which this screen $j$ is mounted may conveniently be connected to a pair of longitudinally slidable supports or bars $k$ and guides $l$ so that the distance of the said screen $j$ from the opaque screen $h$ can be varied at will. The connection between the screen or holder $j$ and the said bars $k$ is preferably of a pivotal nature, so that the said uranium screen $j$ can be turned down out of position when required.

In operation when the light is turned on the ultra-violet rays will be seen to fluoresce on the uranium screen $j$ and then by the insertion of the glass or glasses to be tested between the two screens $h$ and $j$ the merit or relative merits of the glass or glasses so placed can be clearly seen and demonstrated even to persons quite unskilled in optical work. In cases where a piece of Crooke's glass is placed between two screens, the glass, although quite transparent to ordinary light, will be seen to act on the fluorescent screen like an eclipse, shutting off more or less completely the effect thereon of the ultra-violet rays. The comparative values of other forms of tinted and smoked glass can also be tested and demonstrated, as will be readily understood.

By the attachment of a suitable holding device (not shown) the ultra-violet rays can be utilized for projection on to precious stones and pearls to test their genuine merits.

What I claim is:—

1. Apparatus of the kind described comprising a casing containing a source of light, a screen for absorbing visible light, and a second screen placed in front of the first screen and spaced from the latter, whereby the light transmitting qualities of materials interposed between the two screens can be tested.

2. Apparatus according to claim 1, in which one or both of the screens are adjustably mounted in relation to the source of light.

3. Apparatus of the character described, comprising a casing containing a source of light rich in ultra-violet rays, a screen of opaque glass adapted to absorb visible light to permit ultra-violet rays to pass, and a fluorescent screen of uranium glass placed in front of and spaced from the first screen cooperating with the ultra-violet rays, whereby the light transmitting qualities of materials placed between the two screens can be tested.

4. In an apparatus of the character described, the combination of a casing containing a source of light, an opaque screen arranged in front of the light, and a second screen made of uranium glass upon which rays of light after passing through the first screen are adapted to fluoresce, said screens being spaced from each other whereby the light transmitting qualities of materials placed between the two screens can be tested.

In testimony whereof I have hereunto signed my name.

CHARLES STUART PYSER.